(12) United States Patent
Lu et al.

(10) Patent No.: US 10,905,991 B2
(45) Date of Patent: Feb. 2, 2021

(54) ADSORBENT BREATHER FOR ENCLOSURE PROTECTION

(71) Applicants: W. L. Gore & Associates, Inc., Newark, DE (US); W. L. Gore & Associates Technologies (Shenzhen) Co., Ltd., Shenzhen (CN)

(72) Inventors: Xiao Chun Lu, Newark, DE (US); Rajan Gidumal, Newark, DE (US); Xishou Li, Newark, DE (US)

(73) Assignees: W. L. Gore & Associates, inc., Newark, DE (US); W. L. Gore & Associates Technologies (Shenzhen) Co., Ltd., Guangdong (CN)

(*) Notice: Subject to any disclaimer, the term of this patent is extended or adjusted under 35 U.S.C. 154(b) by 217 days.

(21) Appl. No.: 16/318,784

(22) PCT Filed: Jul. 20, 2016

(86) PCT No.: PCT/CN2016/090664
§ 371 (c)(1),
(2) Date: Jan. 18, 2019

(87) PCT Pub. No.: WO2018/014250
PCT Pub. Date: Jan. 25, 2018

(65) Prior Publication Data
US 2019/0282945 A1    Sep. 19, 2019

(51) Int. Cl.
*B01D 46/10* (2006.01)
*B01D 46/00* (2006.01)
(Continued)

(52) U.S. Cl.
CPC ........ *B01D 46/10* (2013.01); *B01D 46/0036* (2013.01); *B01D 46/543* (2013.01);
(Continued)

(58) Field of Classification Search
CPC .. B01D 46/10; B01D 46/0036; B01D 46/543; B01D 53/02; B01D 53/229;
(Continued)

(56) References Cited

U.S. PATENT DOCUMENTS

| 4,274,848 A * | 6/1981 | La Gro | A61F 5/441 |
| | | | 96/6 |
| 5,417,743 A * | 5/1995 | Dauber | B01D 46/10 |
| | | | 360/99.15 |

(Continued)

FOREIGN PATENT DOCUMENTS

| CN | 101379564 A | 3/2009 |
| CN | 101632127 A | 1/2010 |

(Continued)

OTHER PUBLICATIONS

International Search Report and Written Opinion from International Application No. PCT/CN2016/090664 dated Apr. 12, 2017.

*Primary Examiner* — Robert Clemente
(74) *Attorney, Agent, or Firm* — Greenberg Traurig, LLP (57) ABSTRACT

An adsorbent breather assembly for filtering contaminants such as particulars and vapor phase contaminants, e.g. volatile organic compounds, for use with electronic devices can include a blocking region adjacent to the adsorbent filter layer to improve filtering performance.

18 Claims, 8 Drawing Sheets

(51) Int. Cl.
  *B01D 53/02* (2006.01)
  *B01D 46/54* (2006.01)
  *B01D 53/22* (2006.01)
  *G11B 25/04* (2006.01)
  *G11B 33/14* (2006.01)

(52) U.S. Cl.
  CPC ............ *B01D 53/02* (2013.01); *B01D 53/229* (2013.01); *G11B 25/043* (2013.01); *G11B 33/146* (2013.01); *G11B 33/1486* (2013.01); *B01D 2251/304* (2013.01); *B01D 2251/306* (2013.01); *B01D 2251/404* (2013.01); *B01D 2251/60* (2013.01); *B01D 2253/102* (2013.01); *B01D 2253/104* (2013.01); *B01D 2253/106* (2013.01); *B01D 2253/108* (2013.01); *B01D 2257/708* (2013.01); *B01D 2275/10* (2013.01); *B01D 2279/51* (2013.01)

(58) Field of Classification Search
  CPC ........ B01D 2251/304; B01D 2251/306; B01D 2251/404; B01D 2251/60; B01D 2253/102; B01D 2253/104; B01D 2253/106; B01D 2253/108; B01D 2257/708; B01D 2275/10; B01D 2279/51; B01D 53/0407; G11B 25/043; G11B 33/146; G11B 33/1486
  See application file for complete search history.

(56) References Cited

U.S. PATENT DOCUMENTS

| | | | | |
|---|---|---|---|---|
| 5,997,614 | A * | 12/1999 | Tuma | B01D 46/10 360/99.19 |
| 6,296,691 | B1 * | 10/2001 | Gidumal | B01D 46/0032 360/99.16 |
| 6,475,270 | B1 * | 11/2002 | Graeve | B01D 53/268 55/385.6 |
| 6,683,746 | B1 * | 1/2004 | Kuroki | G11B 33/146 360/97.18 |
| 8,568,503 | B2 * | 10/2013 | Sasaki | B01D 53/0407 55/385.6 |
| 2003/0047078 | A1 | 3/2003 | Okayama et al. | |
| 2003/0056653 | A1 * | 3/2003 | Ueki | G11B 33/146 96/134 |
| 2004/0231518 | A1 * | 11/2004 | Johnson | B01D 46/0036 96/134 |
| 2006/0032371 | A1 * | 2/2006 | Dauber | B01D 46/0032 95/90 |
| 2007/0283809 | A1 | 12/2007 | Boulay et al. | |
| 2009/0090245 | A1 * | 4/2009 | Olszewski | B01D 46/543 96/154 |
| 2011/0277638 | A1 | 11/2011 | Li et al. | |
| 2012/0060693 | A1 * | 3/2012 | Sasaki | F24F 13/085 96/139 |

FOREIGN PATENT DOCUMENTS

| | | |
|---|---|---|
| CN | 102413898 A | 4/2012 |
| CN | 102413898 A | 4/2012 |
| JP | 2002-269967 A | 9/2002 |
| JP | 2008-509809 A | 4/2008 |
| JP | 2010-207663 A | 9/2010 |
| JP | 2002-355514 A | 12/2012 |
| WO | WO-2006/020932 A2 | 2/2006 |

* cited by examiner

ADSORBENT BREATHER FOR ENCLOSURE PROTECTION

RELATED APPLICATIONS

The present application is a national phase filing under 35 USC 371 of International Application No. PCT/CN2016/090664, filed on Jul. 20, 2016, the entire contents and disclosures of which are hereby incorporated by reference.

TECHNICAL FIELD

The present disclosure relates generally to adsorbent filter devices for protecting electronics from environmental conditions, including moisture and airborne contaminants, and methods for mitigating contamination of an electronic device enclosure.

BACKGROUND OF THE INVENTION

Adsorbent breather technology is utilized in many applications and environments, for protecting sensitive components of electronic devices (e.g. hard disk drives (HDD's)) from environmental conditions.

Many enclosures that contain such sensitive equipment must maintain very clean environments in order for the equipment to operate properly. Examples include enclosures for the following: optical surfaces or electronic components that are sensitive to particulates and gaseous contaminants which can interfere with mechanical, optical, or electrical operation; data recording devices, such as computer hard disk drives that are sensitive to particles, organic vapors, and corrosive vapors; processing and storage of thin films and semiconductor wafers; and electronic controls such as those used in automobiles and industrial applications that can be sensitive to particles, moisture buildup and corrosion as well as contamination from fluids and vapors. Contamination in such enclosures originates from both inside and outside the enclosures. For example, HDD's may be damaged as a result from external contaminants entering the enclosure for the HDD. The contaminants may also include particles and vapors generated from inside the HDD enclosure.

Known adsorbent filters are disclosed in, for example, U.S. Pat. No. 7,306,695, (the '695 patent) which is hereby incorporated by reference for all purpose. The '695 patent discloses a device for filtering contaminants, such as particulates and vapor phase contaminants, from a confined environment such as electronic or optical devices susceptible to contamination (e.g. computer disk drives) by improving performance and possibly incorporating multiple filtration functions into a unitary filter. The filter includes flow layers which improve filter performance. Filtration functions include a passive adsorbent assembly and can include a combination of inlet, breather filter, and adsorbent filter. Moreover, recirculation filter, diffusion tube and outside mount functions can be added to the filter depending on desired functionality within the enclosure.

Other adsorbent filters include those disclosed in the following references.

U.S. Pat. No. 4,863,499 discloses an anti-diffusion chemical breather assembly for disk drives with filter media having a layer impregnated with activated charcoal granules; U.S. Pat. No. 5,030,260 discloses a unitary filter medium with impregnated activated carbon filters to protect against organic and corrosive pollutants; and U.S. Pat. No. 5,447,695 discloses a chemical breather filter assembly. However, these aforementioned technologies require larger volumes to be effective, and this is not suited to a very thin or a very small enclosure.

Space-saving assemblies have been described in some of the following references. U.S. Pat. No. 6,266,208 describes a unitary filter incorporating a recirculation filter, breather filter, and adsorbent filter. U.S. Pat. No. 6,238,208 describes a rigid assembly filter incorporating a breather filter, adsorbent filter, and recirculation filter. U.S. Pat. No. 6,296,691 describes a molded filter incorporating a breather filter and recirculation filter. U.S. Pat. No. 6,495,073 describes incorporating a recirculation filter and a breather filter with an optional adsorbent filter into a low profile adhesive construction. However, with the exception of U.S. Pat. No. 6,495,073, the aforementioned technologies are of considerable size, and they do not scale to a size appropriate for an electronic device enclosure like a hard disk drive with a small form factor.

Low-profile designs have compromised either airflow rate or compromised adsorption performance. For example, U.S. Pat. No. 6,683,746 discloses a filter assembly that allows for bypass of the filter to increase airflow, sacrificing adsorption if too much air bypasses the filter; and U.S. Pat. No. 6,712,887 discloses grooves in an adsorbent media to increase airflow, but results in large thickness of the filter.

Accordingly, there is a need for adsorbent breather technology for protecting sensitive components of electronic devices that can operate with a low profile in small enclosures without sacrificing airflow or adsorption performance.

BRIEF SUMMARY OF SOME EXAMPLE EMBODIMENTS

According to some embodiments of the present disclosure,

In some embodiments, an adsorbent breather assembly can be configured for removing contaminants within an enclosure. Exemplary adsorbent breather assemblies can include a fluid port and a flow layer in fluid communication with the fluid port. The flow layer can be a breathable media, e.g. a porous or highly porous media, having at least a bottom surface and a top surface. The adsorbent filter layer is arranged adjacent to the top surface of the flow layer. A blocking region can be arranged adjacent to the adsorbent filter layer and at least partially aligned with the fluid port, the blocking region being configured to prevent fluid passage and/or diffusion through a portion of the filter layer. The filter layer and flow layer can be at least partially encapsulated by a breathable membrane. The filter layer may include any suitable adsorbent layer, such as an activated carbon felt or fabric, carbon tape, or carbon sheet.

In some embodiments, a blocking region for an adsorbent breather assembly is formed by a fluid impermeable blocking layer assembled with the adsorbent breather assembly. The fluid impermeable blocking layer is nonporous to gas, i.e., impermeable to fluids including air containing entrained contaminants. The fluid impermeable blocking layer can include a nonporous material, strip, or film. The blocking layer can be encapsulated within the breathable membrane along with the filter layer and flow layer.

An adsorbent breather assembly can also include an adhesive layer connected with the breathable membrane about a perimeter of the breathable membrane. The adhesive layer can adhere the assembly to a surface of the enclosure. In some cases, the adhesive layer can include an adhesive layer port, the adhesive layer port being at least partially aligned with the blocking region. An adhesive layer port can have an area of between 1.0 and 100 (mm²), or larger. An adhesive layer port can be aligned with a centerline of the assembly. The adhesive layer and the breathable membrane can at least partially enclose the adsorbent filter layer and the flow layer.

A blocking region or regions can be disposed at various positions in different embodiments. For example, a blocking region can be arranged at a top surface of the adsorbent filter layer opposite the flow layer. In some other cases, a blocking region can be arranged at a bottom surface of the adsorbent filter layer adjacent to the flow layer. A blocking region or regions may be embedded in the adsorbent filter layer as well, or disposed in any suitable combination of the above. For example, in some cases, an adsorbent filter layer can include multiple adsorbent filter layers arranged in at least partial contact with one another, and one or more fluid impermeable blocking regions can be arranged therebetween, above, and/or below the multiple adsorbent filter layers.

In embodiments, a blocking region will generally have a larger area than a fluid port aligned with the blocking region. In some cases, a ratio of the blocking region area to a surface area, e.g. an upper surface or a lower surface, of the adsorbent filter layer is from about 10 to 100%. In some cases, a ratio of the blocking region area to a surface area of the adsorbent filter layer is from about 20 to 70%.

In embodiments, a blocking region will generally be aligned with a fluid port, which may in some cases also be aligned with a centerline of the assembly. However, in some cases, the blocking region may be laterally offset from a centerline of the assembly.

In embodiments, the breathable membrane can be configured to permit a primary airflow to flow from the port, through the flow layer, through the adsorbent filter layer, and out of the assembly through the breathable membrane. The breathable membrane may also be configured to permit a secondary airflow to pass or diffuse into the adsorbent filter layer through the breathable membrane and then pass or diffuse back out of the adsorbent filter layer through the breathable membrane.

According to some other embodiments of the present disclosure, a method of mitigating contamination of an electronic device enclosure is disclosed. Such methods can include, for example, flowing a primary airflow from an exterior of the electronic assembly enclosure through an inlet and into an interior of the electronic assembly enclosure through a suitable adsorbent breather assembly, as described above. The flow of air can be passed through a flow layer of the assembly, into an adsorbent filter layer; and around a nonporous blocking region to laterally flow at least a portion of the primary airflow through the adsorbent breather assembly.

According to embodiments, the diffusion pathway of adsorbed contaminate vapors can be blocked to prevent pre-mature vapor breakthrough at the vicinity of the inlet. A secondary airflow from the interior of the electronic assembly enclosure can be flowed through the adsorbent breather assembly, and back to the electronic device assembly interior, to adsorb contaminants in the secondary airflow.

According to some other embodiments of the present disclosure, an electronic device enclosure assembly can be configured to retain an electronic device and include an adsorbent breather assembly as described above. Such electronic device enclosures can include, for example, a port in a wall of the enclosure, and an adsorbent breather assembly as described above. In embodiments, an enclosure can be configured to retain a computer component, such as but not limited to an optical drive, hard disk drive, or memory module.

These and other embodiments, along with many of their advantages and features, are described in more detail in conjunction with the below description and attached figures.

BRIEF DESCRIPTION OF THE DRAWINGS

The present invention will be better understood in view of the appended non-limiting figures.

DETAILED DESCRIPTION

Various embodiments described herein provide an adsorbent breather assembly comprising an adsorbent filter assembly and a breathable membrane that covers the adsorbent filter assembly. The adsorbent filter assemblies include at least one adsorbent filter layer. Because the adsorbent filter layer are larger than the inlet port of the adsorbent breather assembly, a flow layer adjacent to the at least one adsorbent filter layer may be used to spread airflow from an inlet across a surface of the adsorbent filter layer. This flow layer also increases the overall airflow of the adsorbent breather assembly.

In one embodiment, a blocking region is disposed adjacent to the adsorbent filter layer and is aligned with the fluid port of the assembly. In some examples, the fluid port forms an inlet port of the assembly. In some examples, the blocking region is nonporous. The blocking region improves the adsorbent filter assembly performance leading to greater protection from environmental conditions. Advantageously, the blocking region may be positioned to prevent contaminant vapors from prematurely diffusing out of the adsorbent filter layer. For example, the blocking region may block the diffusion path of the contaminant vapors and force the contaminant vapors to diffuse radially outward from the inlet, causing more of the adsorbent filter layer material to be utilized for contaminant removal. This is particularly effective for an adsorbent breather assembly with a very thin adsorbent filter layer.

In one embodiment, there is provided a method of mitigating contamination of an electronic device enclosure, the method comprising flowing a primary airflow from an exterior of the electronic assembly enclosure through an inlet or fluid port of the electronic assembly enclosure and into an interior of the electronic assembly enclosure through an adsorbent breather assembly having a blocking region arranged adjacent to the adsorbent filter layer, and passing the primary airflow around the nonporous blocking region to laterally flow at least a portion of the primary airflow through the adsorbent breather assembly. In some embodiments, this process may also comprise flowing a secondary airflow from the interior of the electronic assembly enclosure and into the adsorbent breather assembly; and flowing the secondary airflow from the adsorbent breather assembly back to the electronic device assembly interior to adsorb contaminants in the secondary airflow.

The adsorbent filter assembly of the flow layer, adsorbent filter layer, and blocking region is encapsulated in a breathable membrane, and in some embodiments, the breathable membrane completely encapsulates the adsorbent filter assembly. The breathable membrane can have a periphery extending beyond an area of the adsorbent filter layer for attaching the assembly with a surface, e.g., a surface of a filtered enclosure. The breathable membrane may be connected with an intervening adhesive layer for facilitating the attachment of the assembly with the surface.

The adsorbent breather assembly may be incorporated in a wide variety of enclosures for electronic components. In particular, the adsorbent breather assembly is suitable for protecting HDD's. For purposes of convenience, even though the adsorbent breather assembly may be described in connection with enclosures for HDD's it should be understood to apply broadly to the wire variety of other enclosures.

The adsorbent filter layer or layers may comprise one or more layers of 100% adsorbent materials, such as granular activated carbon, or may be a filled product matrix such as a scaffold of porous polymeric material compounded with adsorbents that fill the void spaces. Other possibilities include adsorbent impregnated nonwoven materials or adsorbent beads on a scrim where the non-woven materials or scrim may be cellulose or polymeric and may include latex or other binders as well as porous castings or tablets of adsorbents and fillers that are polymeric or ceramic. The adsorbent can also be a mixture of different types of adsorbents.

Suitable adsorbents include: physisorbers (e.g. silica gel, activated carbon, activated alumina, molecular sieves, etc.); chemisorbers (e.g. potassium permanganate, potassium carbonate, potassium hydroxide, potassium iodide, calcium carbonate, calcium sulfate, sodium carbonate, sodium hydroxide, calcium hydroxide, powdered metals or other reactants for scavenging gas phase contaminants); as well as mixtures of these materials. For some applications, it may be desirable to employ multiple layers or regions of adsorbent materials, with each layer or region containing different adsorbents to selectively remove different contaminants as they pass through the filter or as they may be exposed from inside the enclosure.

In one embodiment, the adsorbent can use an adsorbent-filled PTFE membrane wherein adsorbent is entrapped within the reticular PTFE structure as taught by U.S. Pat. No. 4,985,296 and incorporated herein by reference. As used herein, a membrane includes thin sheets, tapes or films of polymeric material. Particles can be packed in a multi-modal manner with particles of different sizes interspersed around one another to fill much of the available void space between particles, so as to increase the amount of active material contained in the PTFE structure. This technique also allows a number of sorbents to be filled into a single layer. The PTFE structure can then be compressed or layered and compressed to attempt to maximize adsorbent loading and density. An adsorbent layer that can be used is discussed in detail in Japanese Patent No. 3171454 (B2).

In some aspects, a flow layer is used adjacent to the adsorbent. As used herein, a "flow layer" is intended to mean a material that allows the passage of gas through pores or interstices. A flow layer may be constructed of any suitably porous material. Alternatively, a flow layer may be constructed of non-porous materials shaped or formed to provide interstices for gas flow channels within the flow layer, or within a surface of the flow layer. For example, interstices or channels may be formed in a surface of the flow layer where the flow layer abuts the adsorbent layer, or where the flow layer abuts an adhesive layer. The gas flow channels may be random or of any configuration or pattern. For example, the pattern may be linear, consisting of either parallel or intersecting grooves in the surface of the flow layer; or the pattern may also be radial and may be centered about an inlet port for an enclosure.

Alternatively, a flow layer may comprise a layer of patterned adhesive. As used herein, a "patterned adhesive" is a layer of adhesive that is discontinuous, or has gaps within the layer exposing the underlying substrate. Such a patterned adhesive layer may be in the form of patterned adhesive lines, which are either parallel or intersecting. In another aspect, the patterned adhesive may be in the form of a matrix of adhesive dots spaced at random or regular intervals. Alternatively, a matrix comprising adhesive dots could be applied to make a crosshatched pattern. The patterned adhesive may be zone or strip coated onto a carrier. In yet another alternative, a zone or strip coat of adhesive may be applied to the filter membrane or to the adsorbent.

The flow layers can allow for improved airflow over the adsorbent material surface, which results in greater filtration and adsorbent performance Using flow layers reduces the pressure drop across the filter. Accordingly, the flow layers, and the surface flow paths provided thereby, permit high-density low airflow adsorbent materials to be used.

An adhesive layer is typically a mounting adhesive layer for mounting the assembly of the adsorbent filter layer and flow layer to a surface, e.g. a surface of an enclosure. However, the adhesive layer may have different constructions. It can be a single layer of transferable adhesive, a single sided adhesive coated onto a carrier or substrate such as polyester or polyethylene or a double-sided adhesive coated onto a carrier or substrate as described. The adhesive must have a high enough peel strength to withstand application use and meet any use specifications that may exist such as high temperature, solvent resistance, FDA approval, repositionable, or low outgassing specifications.

Selection of an appropriate adhesive is understood by one of skill in the art. Embodiments can utilize one layer of 0.001" (0.0025 cm) thick permanent acrylic pressure sensitive adhesive applied to the outer side of the adhesive layer and a second layer of double-sided permanent acrylic pressure sensitive adhesive 0.004" (0.010 cm) thick for the innermost adhesive which contacts the assembly of adsorbent filter material and flow layer. This adhesive has medium to high peel strengths in excess of 20 ounces/inch as measured by Pressure Sensitive Adhesive Council (PSTC) #1 (FTMI) and passes outgassing ASTM E-595-84 specification. A commercially available transfer adhesive is [3M 9457] and a commercially available double-sided adhesive is [3M 415] which both employ an A-40 acrylic adhesive all commercially available from Minnesota Mining Manufacturing, Inc. of Minneapolis, Minn.

Other adhesives, such as hot melt adhesives, thermoset and thermoplastic adhesives, UV curable adhesives, or other curable adhesives, epoxies and other reactive adhesives, etc. are also suitable. Furthermore, if a diffusion tube is desired, adhesives as described in U.S. Pat. No. 5,417,743, the disclosure of which is hereby incorporated by reference, can be used.

Prior to attachment to the surface of an enclosure, the exposed adhesive layers may have one or more release liners adhered thereto to protect the adhesive and to facilitate handling of the filters. The release liners would be removed prior to assembly of the filter onto a surface of an enclosure.

A blocking region can include any fluid-impermeable layer suitable for blocking airflow into or out of a portion of an adsorbent layer. Exemplary blocking regions can include a nonporous adhesive strip, nonporous polymer film, nonporous fabric layer, or similar material layer. In some cases, a blocking region may be formed within an adsorbent layer. For example, a volume within an adsorbent filter layer may be impregnated or formed with a region containing a gas impenetrable substance such as a nonporous plastic, adhesive, or similar material. A blocking region may also be semi-permeable to gas, such that the blocking region restrains the flow of gas therethrough without wholly blocking flow. In one embodiments, the blocking region may be one or more blocking layers adjacent to the adsorbent filter layer.

Specific blocking regions may be formed of any suitable, thin, and fluid-impermeable material, such as a membrane effective to restrict the flow or diffusion of gas therethrough. Blocking layers may be any suitable shape for blocking airflow through a filter. By way of specific example, some suitable materials for a blocking layer can include: EL-92073 or ARclean(R) 92222, both from Adhesive research, Inc., arranged as a circular shaped layer having an area of 10 to 100% of the total area of a surface, e.g. a top or bottom surface, of the adsorbent filter layer. In another embodiment, an adhesive material can be used to form a blocking layer. Examples of suitable adhesive materials include, e.g., low outgas linered polyester tape 6690 by 3M Inc., ultra-high purity acrylic adhesive MP60 by JDC Inc., or similar materials.

A blocking region is preferably smaller than an adsorbent filter layer to which the blocking layer is adjacent, comprising between 10-100% of a total area of a surface (e.g. an upper surface or lower surface) of the adsorbent filter layer, and more preferably 20-70% of a total area of a surface of the adsorbent filter layer.

Different blocking regions may be provided for an adsorbent breather assembly. For example, a blocking region may be adjacent to an adsorbent filter layer on a side of the adsorbent filter layer facing an interior of the enclosure. Blocking regions may be placed inside or outside of a breathable membrane enclosing the adsorbent filter layer. In some cases, blocking regions may alternatively be arranged in-between the adsorbent filter layer and a flow layer, on a side of the adsorbent filter layer facing a wall of the enclosure to which the adsorbent breather assembly is attached. In some cases, blocking regions may alternatively be arranged within an adsorbent filter layer (e.g. as a volume impregnated with a nonporous material), or may be arranged in-between two or more layers of adsorbent filtering material forming the adsorbent filter layer. In further embodiments, two or more blocking regions as described above may be provided for a single adsorbent breather assembly. The number of blocking regions may match or otherwise depend on the number of adsorbent filtering layers in the adsorbent breather assembly.

Breathable membranes can be used as a filter media to cover the adsorbent filter assembly. In one embodiment, the breathable membrane may completely encapsulate the adsorbent filter layer, adjacent flow layer, and blocking region. In one embodiment, suitable breathable membranes include fluoropolymers, such as polytetrafluoroethylene (PTFE), polyvinylidene fluoride (PVDF), tetrafluoroethylene-hexafluoropropylene copolymer (FEP), tetrafluoroethylene-(perfluoroalkyl) vinyl ether copolymer (PFA), and the like. One such breathable membrane that can be used to cover the adsorbent filter layer is a layer of expanded PTFE membrane made in accordance with U.S. Pat. No. 4,902,423, which is incorporated herein by reference. This ePTFE membrane has several advantages. It can be made very highly permeable, with resistances to airflow of less than 0.5 mm $H_2O$ @10.5 feet per minute (3.2 meters per minute) and still contain adsorbent particulates within the adsorbent filter layer. In another embodiment the ePTFE membrane has a minimum airflow of less than 200 mm $H_2O$ @10.5 feet per minute. The airflow measurement was done using a standard TSI(R) automated filter tester. Suitable TSI(R) automated filter testers include, e.g. TSI(R) Model 3160 and/or Model 3140 automated filter testers.

Using ePTFE membranes in a filter material to cover the adsorbent filter layer imparts a number of additional advantages to this adsorbent breather assembly. First, ePTFE is hydrophobic. Some of the adsorbents used in the industry use a water-soluble salt to impregnate a physical adsorbent such as activated carbon to provide a chemical adsorbent with a large active surface area. However, the water-soluble chemisorbent salts would be removed if the filter is washed. By covering a carbon layer with the ePTFE membrane, the assembly becomes waterproof and washable, so that water can come into contact with the assembly and not penetrate the adsorbent.

Washability is important because ionic contamination is a major concern for corrosion susceptible apparatus such as computer disk drives. Ions of concern, such as chlorine and sulfur dioxide, are readily soluble in water, so washing with deionized water has become routine for preparing many components used within a drive. Also, reworking of drives that initially fail certification is common in the industry and often washing the drive housing is included in reworking. Thus, embodiments utilizing ePTFE membranes to encapsulate the adsorbent allows use of water soluble, salt treated adsorbents and can withstand washing without losing adsorbent effectiveness. Furthermore, using ePTFE membranes can simplify reworking by allowing washing to be done without having to remove the adsorbent breather assembly from the housing.

While the ePTFE membranes mentioned above are hydrophobic and can be washed, they also have a high vapor transmission rate, which allows contaminants in the air (e.g. within the enclosure, in contact with the ePTFE membrane) to quickly and easily diffuse through the membrane into the adsorbents. PTFE and ePTFE membranes can also be made with very good filtration efficiencies. An exemplary membrane could be made in accordance with U.S. Pat. Nos. 3,953,566; 5,476,589; and 7,306,729. Such a membrane can have a filtration efficiency of 99.97% or higher at 0.3 microns sized particles measured by standard TSI tester. The membrane is commercially available in finished filters from W. L. Gore and Associates, Inc.

Additionally, ePTFE is a non-outgassing inert binder that can be used as an adsorbent binder by mechanically entrapping adsorbent particles within the ePTFE material. This entrapment effectively reduces dusting of adsorbent material during the manufacture and during the life of the filter. This material can also be made in a relatively thin, highly loaded material as described in U.S. Pat. No. 4,985,296. For example, an ePTFE/adsorbent composite can be made in thicknesses from less than 0.001" to more than 0.400". This allows for flexibility in finished filter thicknesses and adsorbent loading. Additionally, sorbent densities approximating 80-95% of full density are possible with multi-model packing and physical compression, so that greater amounts of adsorbent material can be packed per unit volume. Unlike binders such as acrylics, melted plastic resins, etc., ePTFE does not block the adsorbent pores of adsorbent materials.

Embodiments can use any suitable adsorbent materials and their combinations and can be tailored for preferential performance in filtering of air from both internal and external sources for hazardous vapor contaminants.

The adsorbent breather assembly can further be combined with an optional diffusion tube to improve the performance of the breather component. The adsorbent breather assembly can still further be combined with a gasket to provide a means of sealing an enclosure when the assembly is attached with the enclosure. Embodiments can be used in conjunction with systems wherein air is driven by normal convection, by diffusion means, by forcing such as an auxiliary fan, or by some combination thereof.

A diffusion tube can be provided with embodiments of the adsorbent breather assembly as described in U.S. Pat. Nos. 5,417,743 and 5,997,614, which are incorporated by reference. Diffusion tubes provide additional protection against vaporous contaminants (including moisture) entering the drive by providing a diffusion barrier in the form of the diffusion tube which creates a tortuous or a longer path for contaminants to diffuse through before entering a filtered enclosure. Diffusion tubes reduce the quantity of contaminants reaching the interior of the enclosure (and/or the adsorbent depending on the location of the diffusion tube relative to the adsorbent layer) and increase the humidity time constants or time required to reach humidity equilibrium with the environment. As used herein, for convenience, the term "diffusion tube" may refer to either a conventional tortuous path or it may refer to a non-tortuous cavity into which incoming air passes before entering the adsorbent breather assembly.

Filter effectiveness decreases over time as contaminant concentration in the filter increases locally. For example, in known filter designs, airflow flows into the adsorbent breather assembly and the contaminate vapors are adsorbed by the adsorbent filter layer near the inlet. In such configurations, the adsorbent filter layer is loaded with contaminants in greater concentrations near the inlet than anywhere else. Due to the concentration gradient, the adsorbed contaminate vapors will diffuse to the areas with less concentrated vapors. Failure of the filtering layer occurs when the vapors diffuse through (or breakthrough) the adsorbent filter layer at the region near the inlet, such that the airflow passing through the filtering layer exceeds a predetermined acceptable threshold concentration of contaminant vapors. To prevent such contaminate vapor premature "breakthrough," which becomes more pronounced as the thickness of an adsorbent filter layer is decreased, embodiments of the adsorbent breather assembly herein described block the diffusion pathway of contaminate vapor. For example, the diffusion pathway through the adsorbent breather assembly can be blocked local to the airflow inlet with a blocking region, forcing a greater proportion of the air that passes through the adsorbent breather assembly to move away from the inlet. Thus, any contaminate vapor diffusing from the inlet is forced to diffuse through the adsorbent breather assembly around the blocking region, resulting in a more evenly distributed use of the adsorbent filter layer. Thus, instead of failing quickly at a small local region, the life of the adsorbent filter layer is prolonged as contaminant concentration builds up more gradually over a larger area of the adsorbent filter layer.

Embodiments described herein also address enclosures incorporating one or more adsorbent breather assemblies. Such enclosures may be configured to enclose any electronic device, system, or manufacturing process that requires a clean operating or storage environment. Such processes may include, but are not limited to: optical surfaces or electronic connections; data recording devices, such as computer hard disk drives; processing and storage systems for thin films and semiconductor wafers; electronic controls such as those used in automobiles and industrial applications, biological sample processing and storage, e.g. for medical or chemical analytical systems, or other comparable systems. In some cases, enclosures may be directed to small devices, e.g. hard disk drive enclosures, optical disk drive enclosures, or the like. In some cases, enclosures may be significantly larger, e.g. automated analytical equipment housings, sample storage housings, or the like.

According to embodiments, enclosures incorporating an adsorbent breather assembly can include a port (which may be an inlet hole, outlet hole, or a hole arranged for both inlet and outlet) for exchanging airflow with the environment. In some cases, the port of the enclosure may be aligned with a port (i.e., inlet hole) of an adhesive layer of the adsorbent breather assembly, such that air can pass directly through both ports. In some other embodiments, an adhesive layer of the adsorbent breather assembly may be omitted, such that the port of the enclosure passes directly into or out of the adsorbent breather assembly without passing through a second port. In some other cases, ports of the enclosure and of the adsorbent breather assembly may be provided, and may be offset from one another and connected by a channel. A primary airflow can flow into the enclosure through the port or ports and passing through the adsorbent breather assembly. In addition, a secondary airflow inside the enclosure can pass or diffuse through portions of the adsorbent filtering layer of the adsorbent breather assembly. Thus, the adsorbent breather assembly can capture airborne contaminants in both a primary airflow into the enclosure, and in a secondary airflow within the enclosure. In one embodiment, the adsorbent breather assembly may filter a secondary airflow circulating inside an enclosure containing the assembly such that no less than 90% of volatile contaminants are captured from the secondary airflow. The enclosure can therefore decontaminate air flowing into the device and also decontaminate air already flowing inside the enclosure by way of the adsorbent breather assembly.

The effectiveness of an adsorbent breather assembly can be assessed in terms of, for example, contaminant vapor breakthrough time. A breakthrough time refers to a duration for which an adsorbent breather assembly can operate with a given airflow rate containing a given contaminant concentration, before the effectiveness of the filter falls below a predetermined benchmark figure. Embodiments herein described can provide an increased organic vapor breakthrough time compared to known filter assemblies by preventing organic vapor pre-mature breakthrough.

Organic vapor breakthrough time can be measured by passing a flow of air containing a predetermined concentration of a volatile organic standard through an adsorbent breather assembly. The concentration of the volatile organic standard can be measured in the airflow exiting the adsorbent breather assembly. A common volatile organic standard used for such tests is trimethylpentane (TMP). Although test results herein are disclosed in terms of TMP breakthrough, breakthrough times will tend to be comparable for similar organic vapors.

In one embodiment, there is provided an adsorbent breather assembly can filter a primary airflow from the port through the assembly such that a 1 cc/min airflow having an initial contaminant concentration $C_0$ of 30,000 ppm volatile organic vapor, such as TMP, is filtered to a filtered contaminant concentration $C(t)$ of less than $0.003 \times C_0$ with a breakthrough time of no less than 100 minutes, e.g., no less than 120 minutes or no less than 150 minutes.

In addition, the effectiveness of an adsorbent breather assembly can be assessed by reference to vapor removal efficacy inside an enclosed space including the adsorbent breather assembly. Embodiments herein described can retain a high vapor removal efficacy (e.g., greater than 90% vapor removal efficacy) while preventing organic vapor pre-mature breakthrough as described above.

The disclosure may be better understood with reference to the Figures, in which like parts have like numbering.

Figure 1:
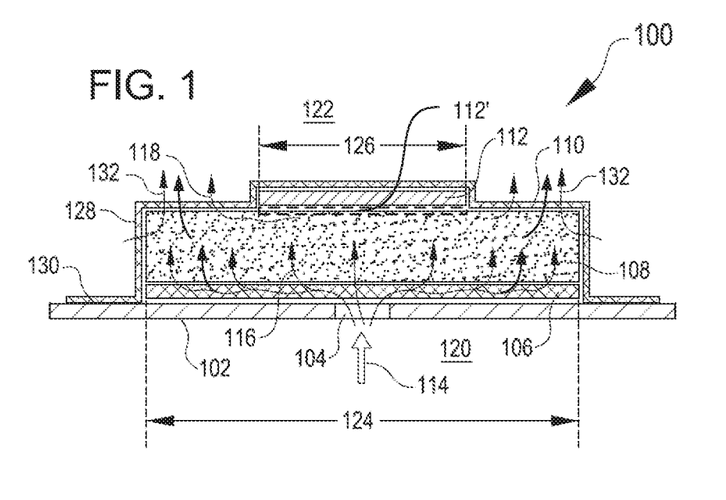
FIG. 1 is a side cross-sectional view of an embodiment of an adsorbent breather assembly.

Referring to FIG. 1, there is shown a side cross-sectional view of an embodiment of an adsorbent breather assembly 100. The adsorbent breather assembly 100 comprises an adsorbent filter assembly including a base layer 102, which may be an adhesive layer for attaching the filter assembly with a device enclosure. In some cases, the base layer 102 can be a base layer with or without adhesive, which may be attached to surface (e.g. of an electronic device enclosure) by any suitable attaching means. The base layer 102 can be formed of any suitable material for providing structure and/or adhesion for the adsorbent breather assembly 100, such as a plastic layer, a plastic film, rubber layer or film, a metal or foil layer, or other suitable layer. The base layer 102 has a port 104 therethrough, the inlet sized to accommodate inlet airflow 114 sufficient to vent a device enclosure. The port can vary in area from about 1.0 and 100 (mm$^2$) or even larger. The port 104 is in fluid communication with an external environment 120, and opposite an enclosed environment 122. The port 104 is positioned adjacent to an inlet (not shown) of a device enclosure such as, e.g., an electronic data storage device such as a hard disk drive, or other electronic device that is sensitive to air quality. In some cases, the inlet airflow 114 may be forced; but generally, the inlet airflow depends on natural aspiration by an attached enclosure (not shown) due to, for example, temperature or pressure changes within the enclosure.

In embodiments the base layer 102 can be an adhesive layer for attaching the assembly 100 to, e.g., a surface of an enclosure for which the adsorbent breather assembly filters air. However, in some cases, the base layer 102 may be omitted, such that the assembly 100 is connected directly with a device enclosure absent the intervening base layer.

The flow layer 106 is operable to spread air from the inlet airflow 114. Generally, the flow layer 106 has higher breathability than the adsorbent filter layer 108. The flow layer 106 can include any suitable breathable media or material that allows the passage of gas therethrough. In particular, the flow layer 106 may possess pores or interstices therethrough for facilitating flow of gas laterally through the flow layer and for dispersing airflow over the bottom surface of the adsorbent filter layer 108. For example, the flow layer 106 can spread the inlet airflow 114 to form a spread flow 116. The spread flow 116 penetrates the adsorbent filter layer 108 across a broad area of the adsorbent filter layer. The spread flow 116 increases the airflow of the adsorbent filter assembly and also reduces the local concentrations of deposited contaminants at any given portion of the adsorbent filter layer 108 as the airflow 114 is filtered.

Breathability of the flow layer 106 can be tested by, for example, a standard TSI(R) automated filter tester, such as TSI(R) Model 3160 and/or Model 3140 automated filter testers. In general, minimum airflow of a flow layer is measured in terms of pressure drop for a predetermined flow rate. In some cases, the flow layer 106 has a pressure drop of less than 10 mm H$_2$O when subjected to airflow flux of 10.5 ft/min (or 5.3 cm/s).

A blocking region 112 is arranged adjacent to the adsorbent filter layer 108. The blocking region 112 is operable to block the contaminate vapor diffusion pathway opposite to the inlet port region. Rather, the blocking region 112 is disposed aligned with the port 104 such that the adsorbed contaminate vapor has to diffuse radially in the adsorbent filter layer 108. In effect, the blocking region 112 creates a blocked portion 112' of the adsorbent filter layer 108 through which contaminate vapors cannot diffuse through, thus forcing the adsorbed vapor to diffuse radially around the adsorbent filter layer below the blocking region. The blocking region 112 or blocked portion 112' has a greater area than the port 104. For example, the blocking region 112 may have an area of between 10 and 100% of the total area of the adsorbent filter layer, or preferably between 20-70% of the total area of the adsorbent filter layer.

The blocking region 112 can be any gas-impermeable layer suitable for blocking airflow, such as an adhesive strip, nonporous polymer film, nonporous fabric layer, or similar blocking layer. In alternative embodiments, a blocked portion 112' may be generated by means other than a nonporous blocking layer (e.g. nonporous blocking region 112). For example, a portion of the adsorbent filter layer 108 may be impregnated, formed, or coated with a region containing a gas impenetrable substance such as a nonporous plastic, adhesive, or similar material.

A breathable membrane 110 encapsulates the flow layer 106 and adsorbent filter layer 108. The blocking region 112 may also be encapsulated by the breathable membrane 110. The breathable membrane 110 can allow the airflow 114 to exit the adsorbent filter layer 108 as a filtered airflow 118 into the enclosed environment 122. The breathable membrane 110 can also allow a secondary airflow 132 to pass and/or diffuse into and out of the adsorbent filter layer 108. Thus, the adsorbent filter layer 108 can remove contaminants in the secondary airflow 132 in order to clean contamination already present or generated within the enclosed environment 122.

The breathable membrane 110 can also include a periphery 130 which can connect the breathable membrane 110 with the base layer 102, e.g. by an adhesive or equivalent means.

The blocking region 112 is sized to redirect the diffusion pathway of adsorbed contaminate vapors through the adsorbent filter layer 108 such that the vapor does not diffuse directly from the port 104 through the adsorbent filter layer in a path orthogonal to the adsorbent filter layer. By blocking vapor diffusion pathway and/or redirecting the vapor diffusion pathway laterally from the port 104 and adsorbent filter layer 108, organic vapor pre-mature breakthrough is mitigated.

Figure 2:
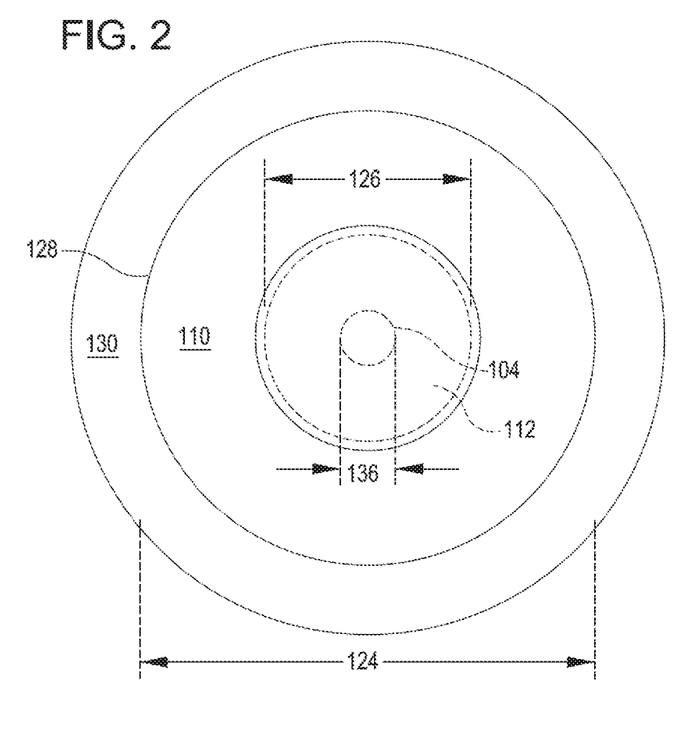
FIG. 2 is a top view of the adsorbent breather assembly of FIG. 1.

FIG. 2 is a top view of the adsorbent breather assembly 100 of FIG. 1 showing an exemplary arrangement of components. The breathable membrane 110 is substantially circular and is concentric with the port 104 and with the blocking region 112. The blocking region 112 has a larger diameter 126 (and concomitantly, a larger area) than the diameter 136 of the port 104. The sidewall 128 of the adsorbent breather assembly 100 also has a larger diameter 124 than the diameter 126 of the blocking region 112. The periphery 130 of the breathable membrane 110 extends laterally beyond the sidewall 128 for facilitating the attachment of the adsorbent breather assembly 100 to either or both of an adhesive layer and a device enclosure (not shown).

Figure 3:
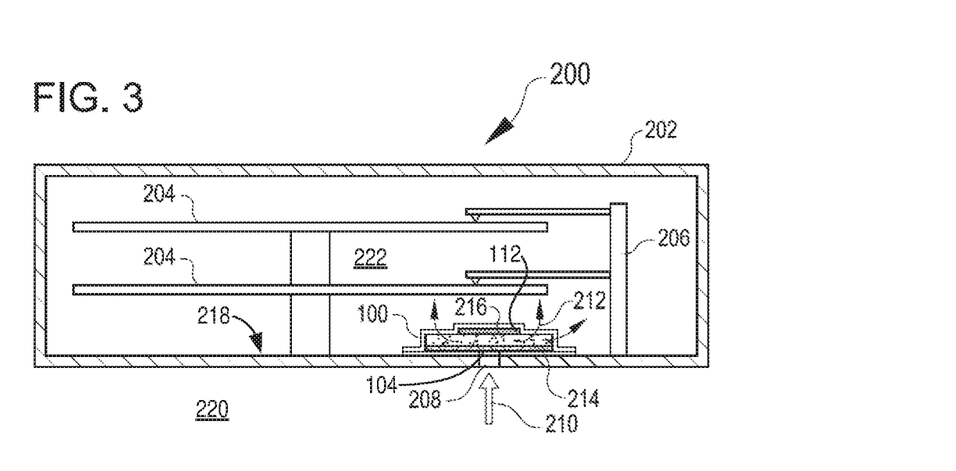
FIG. 3 is a side cross-sectional view of an electronic device assembly showing the adsorbent breather assembly of FIG. 1 installed therein, in accordance with embodiments.

FIG. 3 is a side cross-sectional view of an electronic device assembly 200 including an electronic device enclosure 202 and the adsorbent breather assembly 100 of FIG. 1 installed therein, in accordance with embodiments. By way of nonlimiting example, the electronic device enclosure 202 represents a hard disk drive (HDD) having disks 204 and an actuator assembly 206. Thus, it will be understood that the adsorbent breather assembly 100 may be sized to fit within a narrow region of an enclosure 202 so as not to impinge on componentry or moving parts therein.

The adsorbent breather assembly 100 is shown adhered inside the electronic device enclosure 202 to an interior wall 218 and aligned with an enclosure port 208. The enclosure port 208 can be an inlet port, outlet port, or both. The adsorbent breather assembly 100 is positioned such that a port 104 of the adsorbent breather assembly 100 is at least partially aligned with the enclosure port 208. In alternative embodiments where the adsorbent breather assembly 100 may lack a base layer and concomitant port, the enclosure port 208 can be aligned with the blocking region 112. The electronic device assembly 200 is operable to take inlet airflow 210 from the environment 220 and pass the inlet airflow through the adsorbent breather assembly 100, to an interior airflow 212 in the interior 222 of the electronic device enclosure 202. Circulation airflow within the interior 222 of the electronic device enclosure 202 can also pass/diffuse into and out of the adsorbent breather assembly 100, thus providing a mechanism for ongoing decontamination of the air in the interior.

Figure 4:
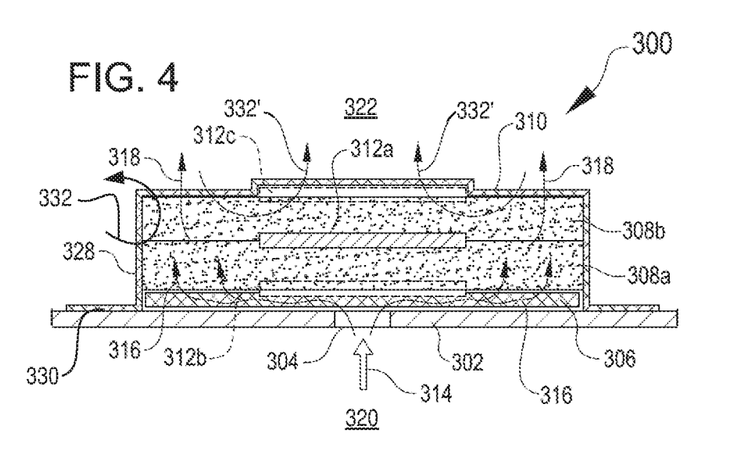
FIG. 4 is a side cross-sectional view of an alternative embodiment of an absorbent breather assembly.

FIG. 4 is a side cross-sectional view of an alternative embodiment of an adsorbent breather assembly 300. In particular, FIG. 4 shows alternative arrangements of the blocking region or regions 312a, 312b, 312c and the adsorbent filter layer or layers 308a, 308b.

The adsorbent breather assembly 300 includes a base layer 302 similar to the base layer 102 shown in FIG. 1. A flow layer 306 is arranged adjacent to the base layer 302, similar to the flow layer 106 (FIG. 1), and a port 304 passes through the base layer similar to the port 104 (FIG. 1). The port 304 allows passage of inlet airflow 314 from an exterior space 320 into the adsorbent breather assembly 300.

In some cases, the adsorbent filter layer(s) may be divided into two or more adsorbent filter layers 308a, 308b, and an intermediate blocking region 312a may be arranged between the adsorbent filter layers 308a, 308b. Such an arrangement can facilitate an upper adsorbent filter layer 308b being exposed across a greater area to an internal volume of a device enclosure when the adsorbent breather assembly 300 is installed in an enclosure. The blocking region 312a may comprise a blocking region, such as a gas-impermeable layer, sandwiched between the lower and upper filter layers 308a, 308b, respectively, or may comprise a gas impermeable portion of the filter layers 308a, 308b, as described above with respect to the blocked portion 112' (see FIG. 1). The flow layer 306, adsorbent filter layers 308a, 308b, and blocking region 312a are encapsulated by a breathable membrane 310 similar to the breathable membrane 110 of FIG. 1.

In some alternative embodiments, additional blocking regions may be provided individually or in combination with one another. For example, a lower blocking region 312b may be provided between the lower adsorbent filter layer 308a and the flow layer 306, such that air from the inlet airflow 314 must pass laterally from the port 304 before passing into the adsorbent filter layers 308a, 308b. Alternatively, or in addition, an upper blocking region 312c may be provided between the upper filter layer 308b and the breathable membrane 310. Various combinations of intermediate, lower, and upper blocking regions (312a, 312b, 312c) are possible. For example, embodiments may possess: an intermediate and a lower blocking region 312a, 312b without an upper blocking region; an upper and lower blocking region 312c, 312b without an intermediate blocking region 312a; an intermediate and an upper blocking region 312a, 312c without a lower blocking region; all three of an intermediate, lower, and upper blocking region 312a, 312b, 312c; or any one of an intermediate, lower, or upper blocking region 312a, 312b, 312c. As described above with respect to blocking region 312a, the lower or upper blocking regions 312b, 312c may alternatively comprise blocking regions formed of gas impermeable portions of the filter layer(s) 308a, 308b.

The inlet flow 314 can be diverted into a spread flow 316 by any suitable blocking region or combination of blocking regions 312a, 312b, and/or 312c. The spread flow 316 passes through the adsorbent filtering layers 308a, 308b which remove organic vapor contaminants from the spread flow 316. The cleaned, spread flow 316 can then exit the adsorbent breather assembly 300 through the breathable membrane 310 as an exit flow 318 into an interior space 322, with the particulate contaminates being removed by the breathable membrane 310.

An interior flow 332 can also circulate/diffuse from within the interior space 322 through the breathable membrane 310 and through a portion of the adsorbent filter layers(s) 308a, 308b. In embodiments that do not have an upper blocking region 312c, an interior flow 322' may pass/diffuse through the breathable membrane 310 in a region above the adsorbent filter layers 308a and/or 308b.

Figure 7:
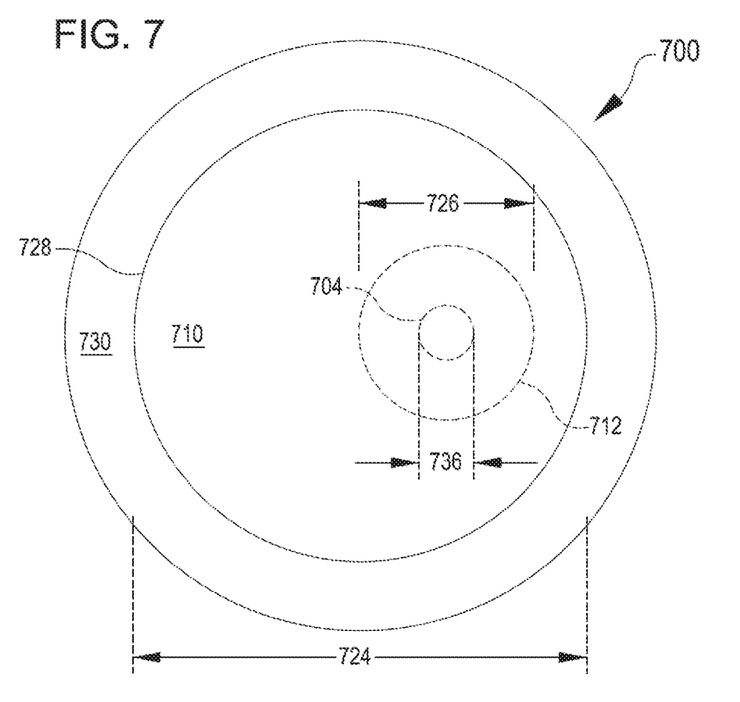
FIG. 7 is a top view of an embodiment of an adsorbent breather assembly.

For example, FIG. 7 is a top view of an alternative embodiment of an adsorbent breather assembly 700 wherein the inlet port 704 and blocking region 712 is not center in the assembly. The diameter 726 of the blocking region 712 is larger than the diameter 736 of the port 704. The breathable membrane 710 is shown as a circular member, concentric with a sidewall 728 that encloses the adsorbent filtering layer and flow layer (not shown) therein. A periphery 730 of the breathable membrane 710 (similar to periphery 130 shown in FIG. 1) is configured for facilitating the attachment of the adsorbent breather assembly 700 with an enclosure (not shown). The diameter 724 of the sidewall 728 is larger than the diameter 726 of the blocking region 712.

Figure 8:
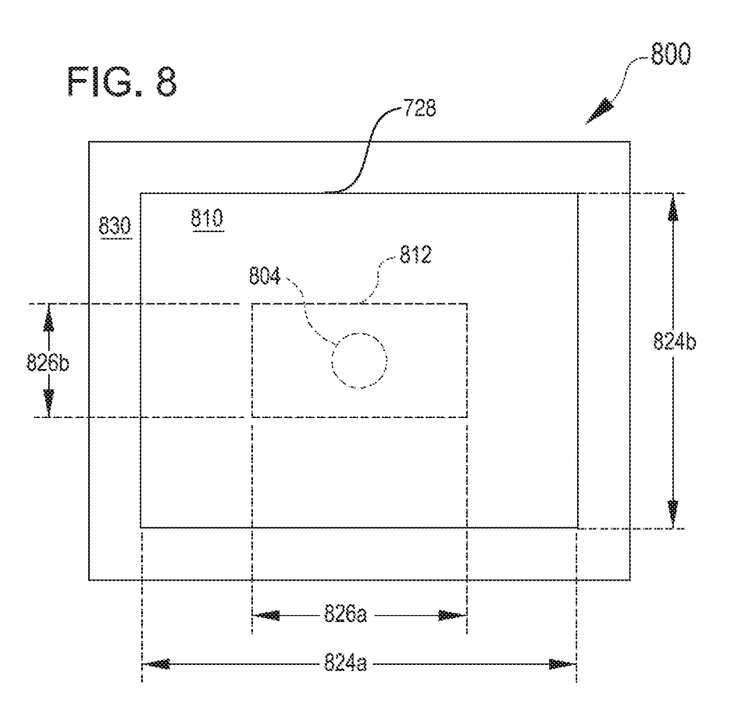
FIG. 8 is a top view of another embodiment of an adsorbent breather assembly.

FIG. 8 is a top view of another alternative embodiment of an adsorbent breather assembly 800 wherein the adsorbent breather assembly 800 is substantially rectangular. In other alternative embodiments, a variety of other shapes are possible without deviating from the spirit of this disclosure. The port 804, which may be circular or rectangular (shown herein as circular), is positioned at least partly aligned with the blocking region 812. Dimensions of the blocking region 812 (e.g. length 826a and width 826b) are larger than the port 804. The breathable membrane 810 extends to a sidewall having dimensions (e.g. length 824a, width 824b) larger than the blocking region. The breathable membrane 810 extends to a periphery 830 similar to the periphery 130

(FIG. 1) configured for facilitating the attachment of the adsorbent breather assembly 800 with an enclosure (not shown).

Other comparable configurations are possible having different, or arbitrary, shapes provided for ports, blocking regions, and boundaries. For example, arbitrary shapes of blocking regions may be provided having feathered, rough, or star-shaped edges for blocking contaminate vapor diffusing and/or dispersing airflow gradually around a perimeter of the blocking region. By way of further example, multiple blocking regions may be provided, i.e. in concentric shapes, for dispersing airflow therebetween. Some blocking regions may have openings or voids therein for passing airflow therethrough, e.g., at increasing frequency in the blocking region with a radial distance away from a centerline containing the port.

Organic Vapor (Trimethylpentane, or TMP) Breakthrough Test:

Volatile organic vapors can damage sensitive electronic equipment, as described above. Accordingly, in addition to filtering particulate contaminants, adsorbent breather assemblies can be configured to decontaminate volatile organic vapors from an inlet flow of air. The adsorbent filter layers (e.g. filter layers 108, 308a, 308b, FIGS. 1 and 4) can capture volatile adsorbent chemicals. However, generally, the organic vapor adsorption capacity of any given volume of adsorbent filter may be limited. To adsorb organic vapor contaminants, a flow of air must (a) bring the organic vapor into contact with the adsorbent material (e.g. activated carbon) and (b) pass the organic vapor through the filtering material at a volume of the adsorbent filtering material that has not already been fully saturated by organic vapor contamination. An adsorbent filter layer can fail to adequately decontaminate a flow of air not only when the filter layer is fully saturated, but also when a localized portion of the filter layer through which the flow passes has become fully saturated.

A "Breakthrough Test" is an empirical method for determining the efficacy of an adsorbent breather assembly by determining the time to failure for a breather assembly under predetermined flow conditions. In a breakthrough test, an adsorbent breather assembly is subjected to a predetermined flow rate of air containing a predetermined concentration of a volatile organic vapor. One suitable volatile organic vapor is trimethylpentane (TMP), a common organic standard used for many industrial applications.

Figure 5:
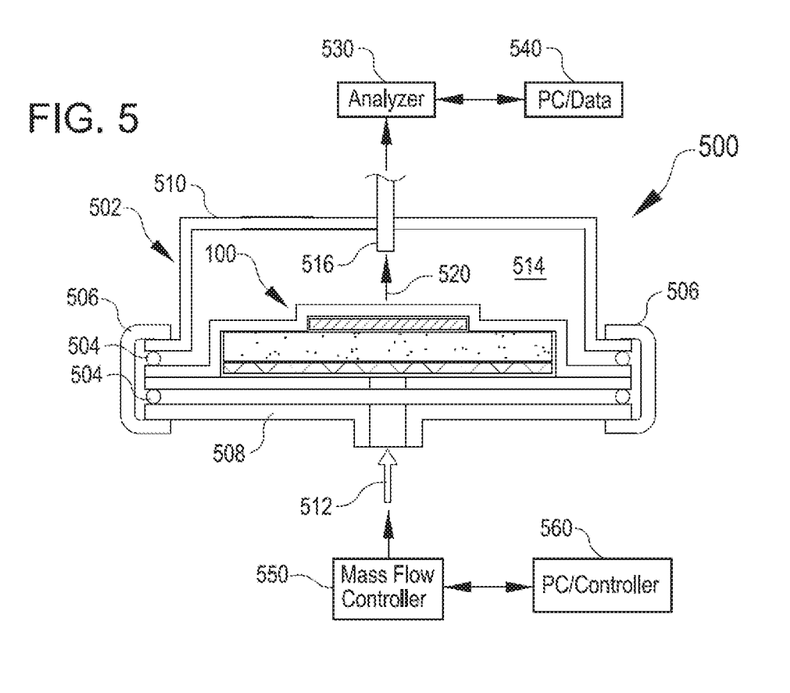
FIG. 5 is a side cross-sectional view of a Trimethylpentane (TMP) breakthrough test assembly and system, in accordance with embodiments.

FIG. 5 is a side cross-sectional view of an organic vapor breakthrough test assembly 502 and system 500 that uses TMP, in accordance with embodiments. In the TMP breakthrough test, an adsorbent breather assembly 100 was secured in a test assembly 502 via seals 504 and clamps 506. Inlet airflow 512 was passed into the test assembly 502 at an inlet side 508. The inlet airflow 512 was flowed at a rate of approximately 1 cc/minute, with an organic vapor contaminant concentration of about 30,000 ppm of TMP entrained therein, by a mass flow controller 550 under the control of a computer/controller 560.

The exit airflow 520 that passed through the adsorbent breather assembly 100 was collected in an exit reservoir 514 bounded by an exit side 510 of the test assembly 502, and passed into an analyzer 530 via an analyzer inlet 516. The analyzer 530 in this case was a gas chromatograph (GC) using a flame ionization detector (FID) pre-calibrated with an external standard to detect a concentration of TMP. The concentration of TMP in the exit airflow 520 was determined by the analyzer 530 in conjunction with a data acquisition/computer module 540 configured to receive data from the analyzer.

Figure 6:
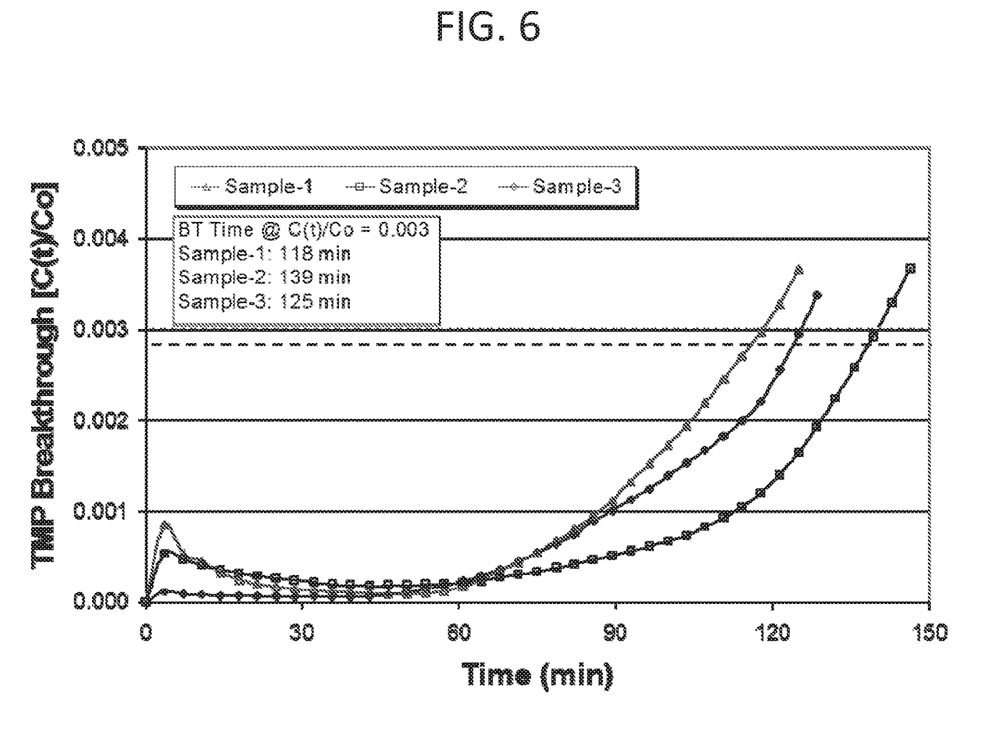
FIG. 6 is a chart illustrating TMP breakthrough performance of various test samples.

FIG. 6 is a chart illustrating TMP breakthrough performance of various test samples. In each case, the concentration of TMP was measured in terms of a concentration ratio of C(t) (concentration at time "t") over the concentration of the unfiltered stream $C_0$ (i.e., $C(t)/C_0$). For purposes of the TMP breakthrough test, a ratio of 0.003 (i.e. 0.3%) was set as an acceptable performance threshold. In the various test samples shown, the time until breakthrough (i.e. the time until $C(t)/C_0$ exceeds 0.003) was greater than 100 minutes. (Specific breakthrough times were, for Sample 1: 118 min; Sample 2: 139 min; Sample 3: 125 min.)

Organic Vapor (TMP) Cleanup Test (VCU)

A "Cleanup Test" is another empirical method for determining the efficacy of an adsorbent breather assembly by quantifying how well an adsorbent breather assembly reduces the concentration of organic vapor as it is introduced into or is generated inside an electronic device enclosure. In the exemplary VCU tests (see Table 1, below); a flow of air containing TMP at a concentration of 25 ppm was introduced into a standard HDD enclosure via an inlet at a rate of 25 cc/min. An outlet at an opposite end of the HDD enclosure released an outlet flow of air to an analyzer including a GC with FID for measuring the final concentration of TMP vapor in the outlet flow.

The VCU efficiency can be calculated in terms of the following equation, where E is efficiency, C(t) is concentration of TMP at time 't', and $C_0$ denotes TMP vapor concentration at the inlet.

$$E_{VCU} = 1 - \frac{C(t)}{C_0}$$

Various comparative samples were prepared having different dimensionalities of blocking regions, as reflected below in Table 1. Tabulated values of TMP breakthrough times are shown in minutes, and tabulated values for VCU efficiencies are listed as a percent and at a time 't' of 120 minutes after introducing TMP containing airflow. The adsorbent filter material was a 0.3 mm thick carbon-PTFE tape.

TABLE 1

TMP vapor breakthrough and TMP vapor clean up efficiency

| Comparative Sample: | Blocking Region Diameter (mm) | TMP Breakthrough Time (Minutes) | Vapor clean up efficiency inside HDD (%) |
|---|---|---|---|
| Circular blocking layer at the top of the adsorbent filter layer | | | |
| 1 | Fully blocked top of adsorbent filter layer | 257.2 | 46.8 |
| 2 | 12 | 192.5 | 90.3 |
| 3 | 10 | 112.0 | 91.4 |
| 4 | 7.2 | 64.0 | 92.5 |
| 5 | No blocking region (control) | 24.0 | 93.7 |
| Circular blocking layer at the bottom of the adsorbent filter layer | | | |
| 6 | 10 | 290.5 | 93.7 |
| 7 | 7.2 | 231.0 | 93.7 |

Table 1 shows how TMP breakthrough time increases with the dimensions of a blocking region positioned at the top of the adsorbent filter layer in an adsorbent breather assembly. As the blocked portion of the adsorbent filter layer increases, the TMP breakthrough time increases. In all cases, the total area of the adsorbent filter layer in the adsorbent breather assembly was about 289 mm$^2$, and the thickness of the adsorbent breather assembly was about 0.93 mm, wherein 0.15 mm consisted of a flow layer and 0.30 mm consisted of an adsorbent filter layer. The port was about 2.5 mm in diameter.

Fully blocking the top of the adsorbent filter layer (see Comparative Sample 1) resulted in TMP breakthrough times in excess of 257 minutes. However, the TMP vapor clean up efficiency of this adsorbent breather assembly inside a HDD was reduced to less than 50%. Conversely, removing the blocking region entirely (see Comparative Sample 5) increased the TMP vapor clean up efficiency inside a HDD to more than 93%, but the TMP breakthrough time was decreased to about 24 minutes. A breakthrough time of 192.5 minutes was achieved with a blocking region with diameter of 12 mm (or 39% of the total adsorbent filter layer area); in which case the TMP vapor clean up efficiency was about 90.3%.

In alternative embodiments, the relative dimensions of the adsorbent filtering layer (or layers), flow layer, and blocking region (or layers) may be varied. The lateral positioning of the various layers relative to one another, as well as their shapes, may also be varied, as described in more detail below. For example, two examples (Comparative Samples 6 and 7) employed blocking regions adjacent to the bottom of the adsorbent filter layer. In either case, breakthrough time and VCU efficacy were acceptable. For Comparative Sample 6, which employed a blocking layer with a 10 mm diameter, breakthrough time was measured at 290.5 minutes with a VCU efficacy of about 93.7%. Similarly, for Comparative Sample 7 with a blocking layer having a 7 mm diameter, breakthrough time was slightly reduced at 231.0 minutes with a VCU efficacy also of about 93.7%.

The invention has now been described in detail for the purposes of clarity and understanding. However, those skilled in the art will appreciate that certain changes and modifications may be practiced within the scope of the appended claims.

In the preceding description, for the purposes of explanation, numerous details have been set forth in order to provide an understanding of various embodiments of the present invention. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present invention. Accordingly, the above description should not be taken as limiting the scope of the present invention or claims.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the present invention, subject to any specifically excluded limit in the stated range. Where the stated range includes one or both of the limits, ranges excluding either or both of those included limits are also included.

As used herein and in the appended claims, the singular forms "a", "an", and "the" include plural references unless the context clearly dictates otherwise. Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

The invention claimed is:

1. An adsorbent breather assembly for removing contaminants within an enclosure having a fluid port, the assembly comprising:
 a flow layer comprising a breathable media having at least a bottom surface and a top surface, the flow layer being in fluid communication with the fluid port;
 an adsorbent filter layer arranged adjacent to the top surface of the flow layer;
 a blocking region adjacent to the adsorbent filter layer and arranged to be at least partially aligned with the fluid port, the blocking region being configured to prevent fluid passage or diffusion therethrough; and
 a breathable membrane encapsulating at least the flow layer and the adsorbent filter layer.

2. The assembly of claim 1, further comprising a fluid impermeable blocking layer, wherein the blocking region is formed by the fluid impermeable blocking layer.

3. The assembly of claim 1, further comprising an adhesive layer connected with the breathable membrane about a perimeter of the breathable membrane and configured to adhere the assembly to a surface of the enclosure.

4. The assembly of claim 1, wherein the adhesive layer further comprises an adhesive layer port, the adhesive layer port being at least partially aligned with the blocking region.

5. The assembly of claim 4, wherein the adhesive layer and the breathable membrane at least partially enclose the adsorbent filter layer and the flow layer.

6. The assembly of claim 1, wherein the blocking region is arranged at a top surface of the adsorbent filter layer opposite the flow layer.

7. The assembly of claim 1, wherein the blocking region is arranged at a bottom surface of the adsorbent filter layer adjacent to the flow layer.

8. The assembly of claim 1, wherein the blocking region is embedded in the adsorbent filter layer.

9. The assembly of claim 1, wherein:
 the adsorbent filter layer comprises a first adsorbent filter layer and a second adsorbent filter layer arranged in at least partial contact with the first adsorbent filter layer; and
 the fluid impermeable blocking region is arranged between the first adsorbent filter layer and the second adsorbent filter layer.

10. The assembly of claim 1, wherein:
 the port has a first area; and
 the blocking region has a second area larger than the first area.

11. The assembly of claim 10, wherein the second area of the blocking region is aligned with the first area of the port and fully encompasses the first area.

12. The assembly of claim 1, wherein:
the ratio of the blocking region area to the adsorbent filter layer area is between 10 and 100%.

13. The assembly of claim 1, wherein the blocking region is encapsulated between the breathable membrane layer and the adsorbent filter layer.

14. The assembly of claim 1, wherein the breathable membrane is configured to permit a primary airflow to flow from the port, through the flow layer, through the adsorbent filter layer, and pass out of the assembly through the breathable membrane; and also configured to permit a secondary airflow to pass or diffuse into the adsorbent filter layer through the breathable membrane and then pass or diffuse back out of the adsorbent filter layer through the breathable membrane.

15. The assembly of claim 1, wherein:
the enclosure comprises an electronic device enclosure configured to retain an electronic device;
the fluid port comprises a port in a wall of the enclosure; and
the breathable membrane is arranged to allow a primary airflow entering the port to flow through the flow layer, through the adsorbent filter layer, and into an interior of the enclosure through the breathable membrane.

16. The assembly of claim 15, wherein the fluid port is an enclosure port, and further comprising:
an adhesive layer, the adhesive layer being arranged adjacent to the flow layer opposite the adsorbent filter layer, wherein the adhesive layer and the breathable membrane encapsulate the flow layer and the adsorbent filter layer, and wherein the adhesive layer has an adhesive layer port therethrough, the adhesive layer port being aligned with the enclosure port.

17. A method of mitigating contamination of an electronic device enclosure, the method comprising:
flowing a primary airflow from an exterior of the electronic assembly enclosure through an inlet of the electronic assembly enclosure and into an interior of the electronic assembly enclosure through an adsorbent breather assembly, the adsorbent breather assembly comprising:
a flow layer arranged in fluid communication with the inlet;
an adsorbent filter layer arranged adjacent to the flow layer; and
a blocking region arranged adjacent to the adsorbent filter layer and aligned with the inlet;
passing the primary airflow through the flow layer and into the adsorbent filter layer;
passing the primary airflow around the nonporous blocking region to laterally flow at least a portion of the primary airflow through the adsorbent breather assembly; and
blocking the diffusion pathway of adsorbed contaminate vapors to prevent pre-mature vapor breakthrough at the vicinity of the inlet hole.

18. The method of claim 17, further comprising:
flowing a secondary airflow from the interior of the electronic assembly enclosure and into the adsorbent breather assembly; and
flowing the secondary airflow from the adsorbent breather assembly back to the electronic device assembly interior to adsorb contaminants in the secondary airflow.

* * * * *